United States Patent [19]

O'Neil

[11] Patent Number: 5,392,522
[45] Date of Patent: Feb. 28, 1995

[54] PLUMB BOB AND COOPERATING REEL

[76] Inventor: Michael J. O'Neil, 3017 Creek Rd., Front Royal, Va. 22630

[21] Appl. No.: 56,832

[22] Filed: May 3, 1993

[51] Int. Cl.$^6$ .............................................. G01C 15/10
[52] U.S. Cl. ....................................... 33/393; 33/392; 33/339
[58] Field of Search ................. 33/392, 393, 394, 273, 33/339, 720; D10/61

[56] References Cited

U.S. PATENT DOCUMENTS

| | | | |
|---|---|---|---|
| 1,586,654 | 6/1926 | Conway | 33/393 |
| 2,184,505 | 12/1939 | Danley | 33/392 |
| 2,594,823 | 4/1952 | Suverkrup | 33/393 |
| 3,011,263 | 12/1961 | Unger | 33/393 |
| 3,405,450 | 10/1968 | Peacock | 33/393 |

FOREIGN PATENT DOCUMENTS

| | | | |
|---|---|---|---|
| 61539 | 3/1891 | Germany | 33/392 |
| 372429 | 3/1923 | Germany | 33/392 |
| 184913 | 9/1936 | Switzerland | 33/393 |
| 268892 | 1/1951 | Switzerland | 33/393 |

Primary Examiner—Thomas B. Will
Attorney, Agent, or Firm—George R. McGuire

[57] ABSTRACT

A plumb bob having a central body portion and at least three substantially identical webs extending outwardly from the body portion along respective radial axes. The angles separating each successive web must be equal to maintain vertical symmetry, and an even distribution of weight, with respect to a longitudinal axis extending centrally through the body portion. In addition, the webs uniformly and linearly taper in a decreasing manner from the top end to the bottom end of the body portion. This geometry permits a worker standing in vertically aligned position above the plumb bob to be able to clearly see both the bottom end of the plumb bob and the preexisting datum from which alignments are being made.

2 Claims, 4 Drawing Sheets

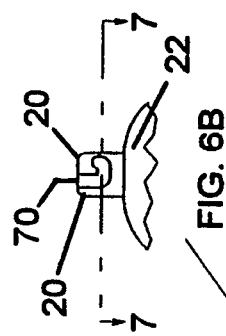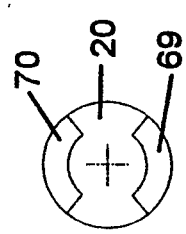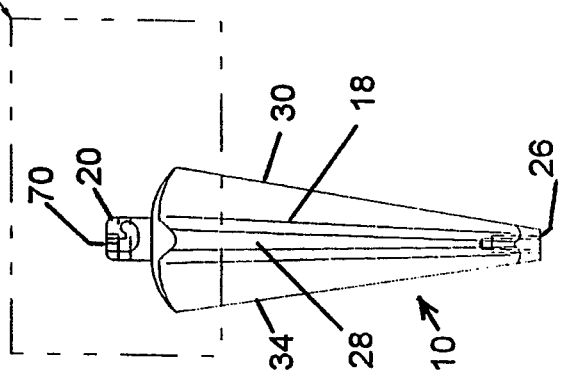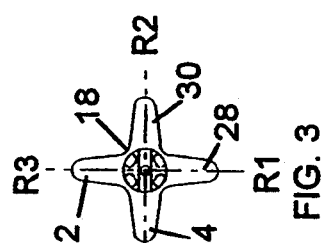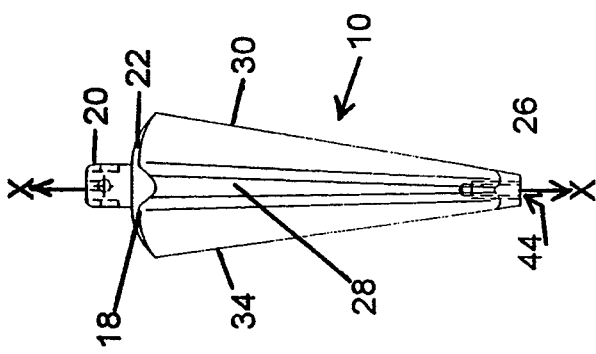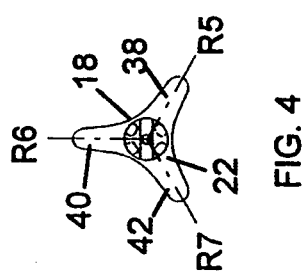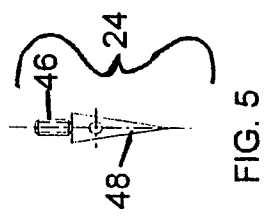

PLUMB BOB AND COOPERATING REEL

BACKGROUND OF THE INVENTION

The present invention generally relates to tools used in the surveying and construction industries. More particularly, the present invention relates to tools, such as plumb bobs, used to establish vertically, or laterally, aligned points with respect to a predetermined datum.

In surveying and construction, it is quite often necessary to establish a point, or set of points, which vertically, or laterally, align with a preexisting point. To accurately establish these points, a tool termed a plumb bob is commonly used. A plumb bob is basically comprised of a heavy weight attached to one end of a string. A worker holds the string such that by the force of gravity the weighted member vertically aligns itself with the preexisting datum. The string then becomes a vertical extension of this datum. On the construction site, the topography of the ground and the botanous growth sometimes prohibit workers from clearly seeing certain datums from a distance. Therefore, a surveyor using a transit may construct a set of laterally aligned points by focusing on the string instead of the datum itself. In a second scenario, a worker constructing a door jamb or similar edifice may extend the string to an overhead structure to determine a point which is vertically aligned with the preexisting datum. In any case, the plumb bob provides a highly accurate tool with which a plurality of vertically and/or laterally aligned points may be established.

Traditionally, plumb bobs have been elongated and symmetrically shaped about a central, linear axis. Typically, a frusto-conical geometry (i.e., a cone tapering inwardly from a maximum diameter at its top to a minimum diameter, or point, at its bottom) is employed in the construction of plumb bobs. Due to its vertical symmetry and even distribution of weight, this shape permits the string to become a highly precise extension of the preexisting datum. Several examples of such plumb bobs may be found in U.S. Pat. No. 2,791,037 to Damron, issued May 7, 1957; and U.S. Pat. No. 4,461,091 to Gammon issued Jul. 24, 1984, as well as British Patents No. 614,735 to Suverkrop, published Dec. 22, 1948; and 1,320,677 to Florin, published Jun. 20, 1973.

The only inaccuracy which may be found with this commonly shaped plumb bob is that of an inaccurate alignment of the plumb bob itself with respect to the preexisting datum. Due to its inwardly tapering, solid body, a worker sighting from above is incapable of seeing both the bottom of the plumb bob and the preexisting datum. To help resolve this inaccuracy, a second worker is sometimes utilized. This second worker kneels on the ground beside the preexisting datum and directs the worker holding the string until the bottom of the plumb bob is substantially vertically aligned with the preexisting point.

In addition to the inaccuracy inherent in prior art plumb bobs, another undesirable feature of the tool is the inability to house the entire flexible line in a reel housing when the plumb bob is not in use. U.S. Pat. No. 3,172,205 to Gammon attempts to protect the line by retracting it into a reel housing when not in use, but this reel fails to house the portion of the line immediately adjacent the top surface of the plumb bob. This causes that particular portion of the line to fray and eventually break, thereby necessitating cutting a small portion of the line and retying it to the plumb bob. Eventually, the line becomes too short to use, thereby rendering the reel useless.

OBJECTS AND ADVANTAGES OF THE PRESENT INVENTION

It is therefore a principal object of the present invention to provide a plumb bob which permits a single worker to view both the tip at the bottom of the plumb bob and the preexisting datum while holding the plumb bob in vertically aligned relation with respect to the preexisting datum.

It is a further object of the present invention to provide a plumb bob which cooperatively engages a reel to house and protect the entire length of flexible line when the plumb bob is not in use.

Other objects and advantages of the present invention will in part be obvious and in part appear hereinafter.

SUMMARY OF THE INVENTION

In accordance with the foregoing objects and advantages, the present invention provides a novel plumb bob having means which improve accuracy over prior art plumb bobs. The improved accuracy means of the present invention inherently lie in the geometry of the plumb bob itself, and is characterized by an increased field of view for the worker holding the plumb bob. The increased field of view permits the worker to see both the bottom of the plumb bob and the preexisting datum while standing in substantially vertical alignment above the datum.

The geometry of the plumb bob is comprised of an elongated body member having a longitudinal axis extending centrally therethrough, and a plurality of integral, axially extending webs annularly spaced about the body portion. Each of the webs has a radial axis associated therewith, and a decreasing taper extending from the top end of the body portion to the bottom end. It is important to note that in order for the body member to maintain a vertically symmetric relationship, and an even distribution of weight, with respect to the longitudinal axis, the angles separating each web must be equal. If these angles are unequal, the plumb bob will not produce an accurate extension of the datum due to its lopsided distribution of weight.

The plumb bob further includes a knobbed portion integrally attached to, and protruding from, the top surface of the body member. The knobbed extension includes a pair of diametrically opposed J-shaped grooves formed into its exterior surface. These grooves provide a secure engagement into a specially designed reel which permits the secure retraction and housing of the flexible line. This secure retraction and housing of the line lengthens its life by keeping it unexposed to other tools and elements which would otherwise chafe and cut the line when not in use.

The specially designed reel includes a conventional spool on which the line is held, a spring operated retraction member attached to the spool, and a novel plumb bob receiving section. The plumb bob receiving section is comprised of a protrusion having an opening which allows the knobbed portion of the plumb bob to sit therein, a pair of opposed, hardened steel pins extending through the sidewalls of the protrusion, and a spring clip fixedly held adjacent the interior, top wall of the protrusion. Once the knobbed portion of the plumb bob is positioned within the receiving protrusion of the reel, it should be rotated about its longitudinal axis until the hardened steel pins engage the hooked portion of the J-shaped grooves. When it becomes necessary to use the plumb bob, it may be rotated until the steel pins pop out of engagement with the J-shaped grooves. When the J-shaped grooves are disengaged from the pins, the resiliency of the spring clip forces the knobbed portion outwardly away from the reel.

BRIEF DESCRIPTION OF THE DRAWINGS

FIG. 2 is a side elevational view of the plumb bob of FIG. 1;

FIG. 3 is a top plan view of the plumb bob of FIG. 1;

FIG. 4 is a top plan view of a second embodiment of a plumb bob;

FIG. 5 is a front elevational view of a removable plumb bob tip;

FIG. 6A is a front elevational view of the plumb bob of FIG. 1;

FIG. 6B is an enlarged front elevational view of the upper portion of the plumb bob of FIG. 6A;

FIG. 7 is a cross-sectional view taken along section line 7—7 of FIG. 6B;

DETAILED DESCRIPTION

Figure 1:
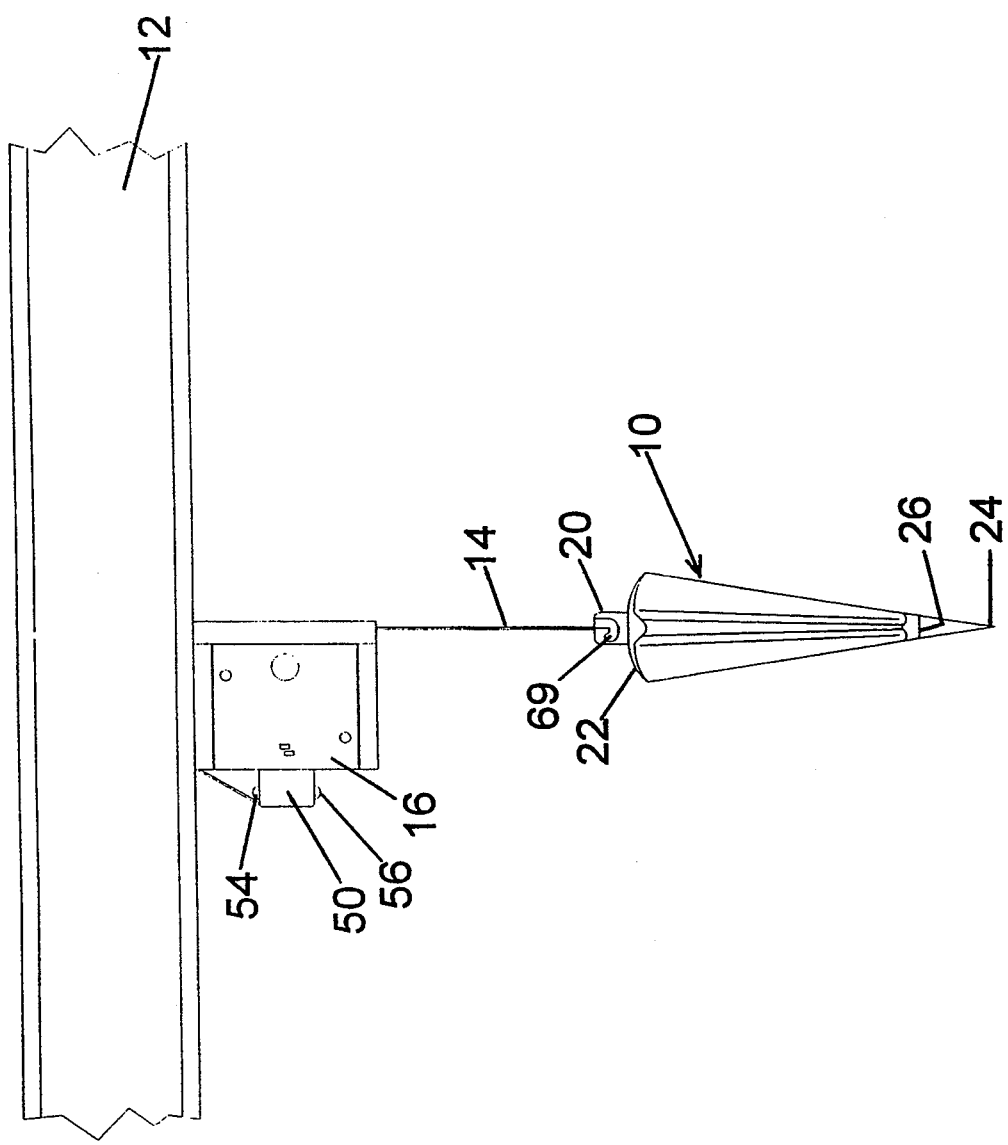
FIG. 1 is a front elevational view of a plumb bob and reel for use therewith suspended from an overhead structure.
Figure 9:
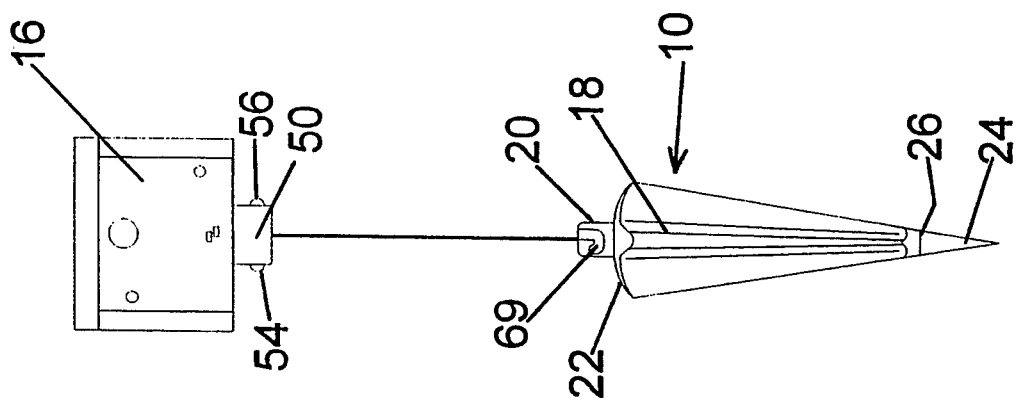
FIG. 9 is a front elevational view of the plumb bob and reel of FIG. 1, showing the reel in another position.
Figure 8:
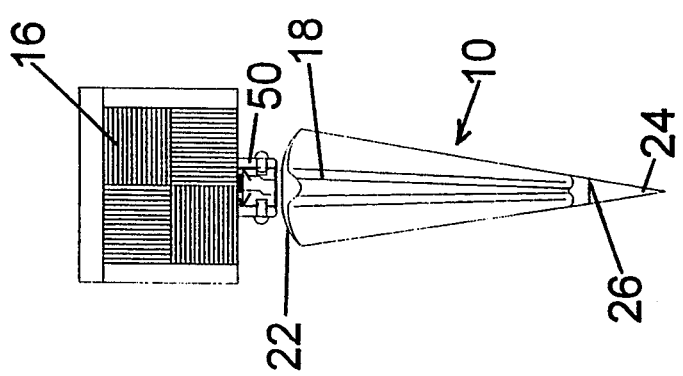
FIG. 8 is a front elevational view of the plumb bob of FIG. 1 fully retracted and secured to a reel.
Figure 12:
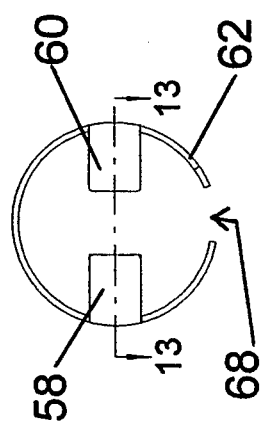
FIG. 12 is a top plan view of the portion shown in FIG. 11.
Figure 11:
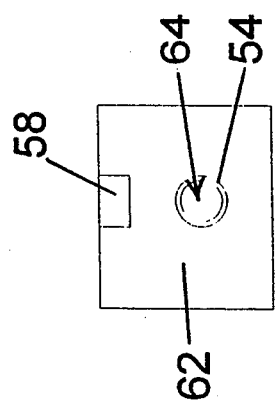
FIG. 11 is a side elevational view of the spring clip portion of the reel of FIG. 10.
Figure 10:
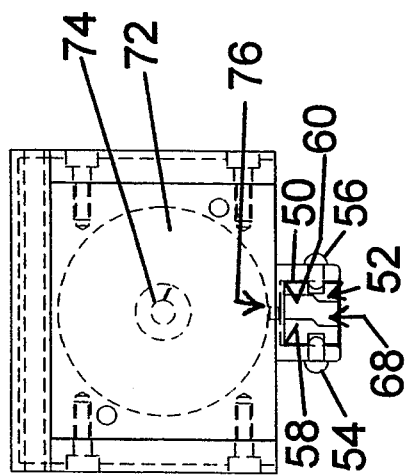
FIG. 10 is a front elevational view of the reel of FIG. 1 showing the internal details thereof.
Figure 13:
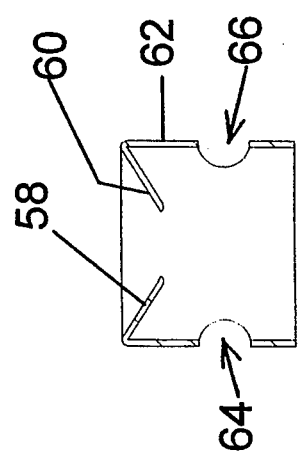
FIG. 13 is a cross-sectional view of the portion shown in FIGS. 11 and 12 taken along section line 13—13 of FIG. 12.

Referring now to the drawing figures, there is seen in FIG. 1 a plumb bob 10 suspended by a flexible line 14 from a reel 16 which is releasably attached to an overhead structure 12, e.g., by a magnet (not shown) within reel 16. Due to the force of gravity, plumb bob 10 may be positioned in vertical alignment over a predetermined datum, thereby causing flexible line 14 to become a vertical extension of the datum. A locus of points, which lie in either vertical or lateral alignment with the datum, may then be easily and accurately established.

As seen in FIG. 2, plumb bob 10 is an elongated object having a longitudinal axis X—X extending centrally therethrough. Plumb bob 10 is comprised of a main body portion 18, a knobbed portion 20 integrally protruding from the top surface 22 of body 18, and a pointed tip 24 (shown in FIG. 1 and separately in FIG. 5) extending downwardly from the bottom end 26 of body 18.

As previously described, one end of a flexible line 14 is connected to top surface 22 of body portion 18. The connection is made by threading line 14 consecutively through a vertically oriented hole 25 and a cooperatively positioned horizontally oriented hole 27 formed in knobbed portion 20, and tying a knot in line 14 at a position adjacent vertical hole 25. As best seen in FIG. 6B, vertically oriented hole 25 extends centrally through the top surface of knobbed portion 20 to the horizontally oriented hole 27 which extends laterally through knobbed portion 20.

In the preferred embodiment of the present invention, body portion 18 is cylindrically shaped; four axially extending webs 28, 30, 32 and 34 extend integrally from body portion 18. Webs 28, 30, 32 and 34 include respective radial axes, $R_1$, $R_2$, $R_3$ and $R_4$ spaced at 90 degree intervals about body portion 18, thereby maintaining vertical symmetry about longitudinal axis X—X. Webs 28, 30, 32 and 34 further include a uniform, linear, decreasing taper extending from top surface 22 down to bottom end 26, thereby maintaining an even distribution weight with respect to longitudinal axis X—X. The vertical symmetry and even distribution of weight about longitudinal axis X—X must be maintained to ensure that flexible line 14 acts as an accurate extension of the predetermined datum.

An alternate embodiment of plumb bob 10 may be seen in FIG. 4 wherein only three axially extending webs 38, 40 and 42 are annularly positioned about body portion 18'. Webs 38, 40 and 42 each include a radial axis $R_5$, $R_6$ and $R_7$ respectively, and are staggered at 120 degree intervals about body portion 18', thereby maintaining vertical symmetry about longitudinal axis X—X. Webs 38, 40 and 42 also taper in a decreasing manner from top surface 22' to the bottom end of body 18' (not seen in this embodiment). Although these two embodiments (4 web and 3 web) have been shown and described herein, the scope of the patent should not be limited thereto as the plumb bob may have any number of webs, provided that the angles separating each web remain equal.

Main body portion 18 further includes a threaded bore 44 blindly extending along longitudinal axis X—X from bottom end 26 to an intermediate position within body 18. Pointed tip 24 includes a threaded portion 46 (FIG. 5) which securely engages bore 44, and a pointed body 48 which has a taper corresponding to the taper of webs 28, 30, 32 and 34. Pointed tip 24 provides the most precise means for vertically aligning plumb bob 10 over a predetermined datum.

Reel 16 includes a plumb bob receiving section 50 which permits knobbed portion 20 of plumb bob 10 to be securely, yet releasably, positioned within receiving section 50. Receiving section 50 includes an open area 52 which is large enough to permit the insertion of knobbed portion 20 therein, a pair of diametrically opposed hardened steel pins 54 and 56 radially extending therethrough, and a pair of spring clips 58 and 60 securely positioned within open area 52. More specifically, spring clips 58 and 60 (see FIGS. 10—13) are resilient extensions from a unitary, annular body 62. Body 62 includes a pair of diametrically opposed apertures 64 and 66 formed therethrough, and a longitudinal slit 68. Slit 68 permits spring clip body 62 to be pinched together so as to fit into bob receiving section 50. When fully inserted within receiving section 50, body 62 may be released and twisted until steel pins 54 and 56 engage apertures 64 and 66. Once pins 54 and 56 engage apertures 64 and 66, body 62 springs to its original shape, thereby securely fixing itself with receiving section 50. Body 62 defines an annular passage into receiving section 50 which is large enough for insertion of knobbed portion 20.

Knobbed portion 20 includes a pair of diametrically opposed J-shaped grooves 69 and 70 formed therein, which, when inserted into receiving section 50 cause steel pins 54 and 56 to engage. As knobbed portion 20 is pushed further into receiving section 50, steel pins 54 and 56 travel down the linear portions of J-shaped grooves 68 and 70, and knobbed portion 20 increases the compressing of spring clips 58 and 60. Once pins 54 and 56 are positioned at the bottom of the linear portion of J-shaped grooves 69 and 70, spring clips 58 and 60 are fully compressed. At this point, plumb bob 10 is rotated in a counter-clockwise direction, thereby causing pins 54 and 60 to travel along the curved portion of J-shaped grooves 69 and 70. Spring clips 58 and 60 then become slightly less than fully compressed and urge knobbed portion 20 downwardly, thereby causing pins 54 and 56 to be lockingly positioned at the tip of curved portions of J-shaped grooves 69 and 70. The downward force of spring clips 58 and 60 on portion 20 ensures that pins 54 and 56 will remain engaged in J-grooves 69 and 70 until a manual force is exerted on plumb bob 10 to overcome the force exerted by spring clips 58 and 60. This manual operation is performed by pushing knobbed portion 20 further into receiving section, thereby forcing spring clips 58 and 60 into a fully compressed state once again, and rotating plumb bob 10 in a clockwise direction until pins 54 and 56 are positioned in the linear portion of J-shaped grooves 69 and 70. Plumb bob 10 may then be released. Spring clips 58 and 60 will urge knobbed portion 20 out of receiving section 50, thereby rendering plumb bob 10 operable.

When knobbed portion 20 is positioned within bob receiving section 50, flexible line 14 is wound onto a spool 72 positioned within reel 16 by a conventional spring winding mechanism 74. Opening 76 provides communication between receiving section 50 and reel 16.

What is claimed is:

1. A plumb bob in combination with a reel comprising:
   a) said plumb bob including:
      i) an elongated, central body portion having a top surface, said body portion being symmetric about a longitudinal axis extending centrally therethrough; and
      ii) an annularly shaped knobbed portion protruding from said top surface of said body portion and having exterior top and side surfaces, and a pair of diametrically opposed J-shaped grooves formed in said exterior side surface, said longitudinal axis extending centrally through said knobbed portion; and
   b) said reel including means for securely housing said knobbed portion therein, said housing means including a plum bob receiving portion integrally attached to said reel, said receiving portion including:
      i) an open cavity defined by top and side walls;
      ii) said side wall having a pair of diametrically opposed apertures formed therethrough;
      iii) means for engaging said J-shaped grooves formed in said knobbed portion; and
      iv) a resilient body member having a contiguous sidewall, a longitudinal slit extending through said side wall, a pair of diametrically Opposed spring clips integrally extending from one edge of said side wall, and a pair of diametrically opposed apertures formed through said side wall.

2. The invention according to claim 1 wherein said groove engaging means is comprised of a pair of pins fixedly extending through said diametrically opposed apertures formed in said side wall of said receiving portion, said pins further extending through said apertures in said resilient body member's side wall, and said diametrically opposed spring clips are positioned adjacent said top wall of said receiving portion.

* * * * *